United States Patent [19]
Winton

[11] Patent Number: 5,393,261
[45] Date of Patent: Feb. 28, 1995

[54] MEAT TENDERIZING DEVICE

[76] Inventor: Carl D. Winton, 733 Milton, Angleton, Tex. 77515

[21] Appl. No.: 199,847

[22] Filed: Feb. 22, 1994

[51] Int. Cl.⁶ .............................................. A22C 9/00
[52] U.S. Cl. .................................................. 452/144
[58] Field of Search ............................... 452/144, 141

[56] References Cited

U.S. PATENT DOCUMENTS

| | | | |
|---|---|---|---|
| 112,092 | 2/1871 | Tarbox | 452/144 |
| 158,280 | 12/1874 | James | 452/144 |
| 282,566 | 8/1883 | Ramsey | 452/144 |
| 504,892 | 9/1893 | Passmore | 452/144 |
| 573,660 | 12/1896 | Hubbell | 452/144 |
| 715,695 | 12/1902 | Robinson | 452/144 |
| 857,568 | 6/1907 | Hurley | 452/144 |
| 1,116,668 | 11/1914 | Barringer | 452/144 |
| 2,396,020 | 3/1946 | Savage | 17/30 |
| 2,791,799 | 5/1957 | Harrison | 452/144 |
| 2,990,863 | 7/1961 | Pantermoller | 452/144 |
| 4,242,774 | 1/1981 | Massaro | 452/144 |

FOREIGN PATENT DOCUMENTS 15387 of 1900 United Kingdom.

*Primary Examiner*—Willis Little
*Attorney, Agent, or Firm*—Harrison & Egbert

[57] ABSTRACT

A meat tenderizing device having a first plate with a surface having a plurality of truncated pyramid projections extending outwardly therefrom, a second plate having a plurality of projections extending outwardly therefrom, a first handle connected to the first plate and extending outwardly therefrom, and a second handle connected to the second plate and extending outwardly therefrom. Each of the truncated pyramid projections has a hole formed in an area opposite to the surface. The projections of the second plate are in a meshing relationship with the plurality of projections of the first plate. The second plate is hingedly connected to the second plate. The first and second handles serve to move the first and second plates between a first meshing position and a second angularly offset position. A ledge extends around a portion of the periphery of the first plate and extends upwardly from the surface of the first plate so as to have a height less than a height of the truncated pyramid projections. The second plate has a second ledge extending around a portion of the periphery of the second plate.

19 Claims, 4 Drawing Sheets

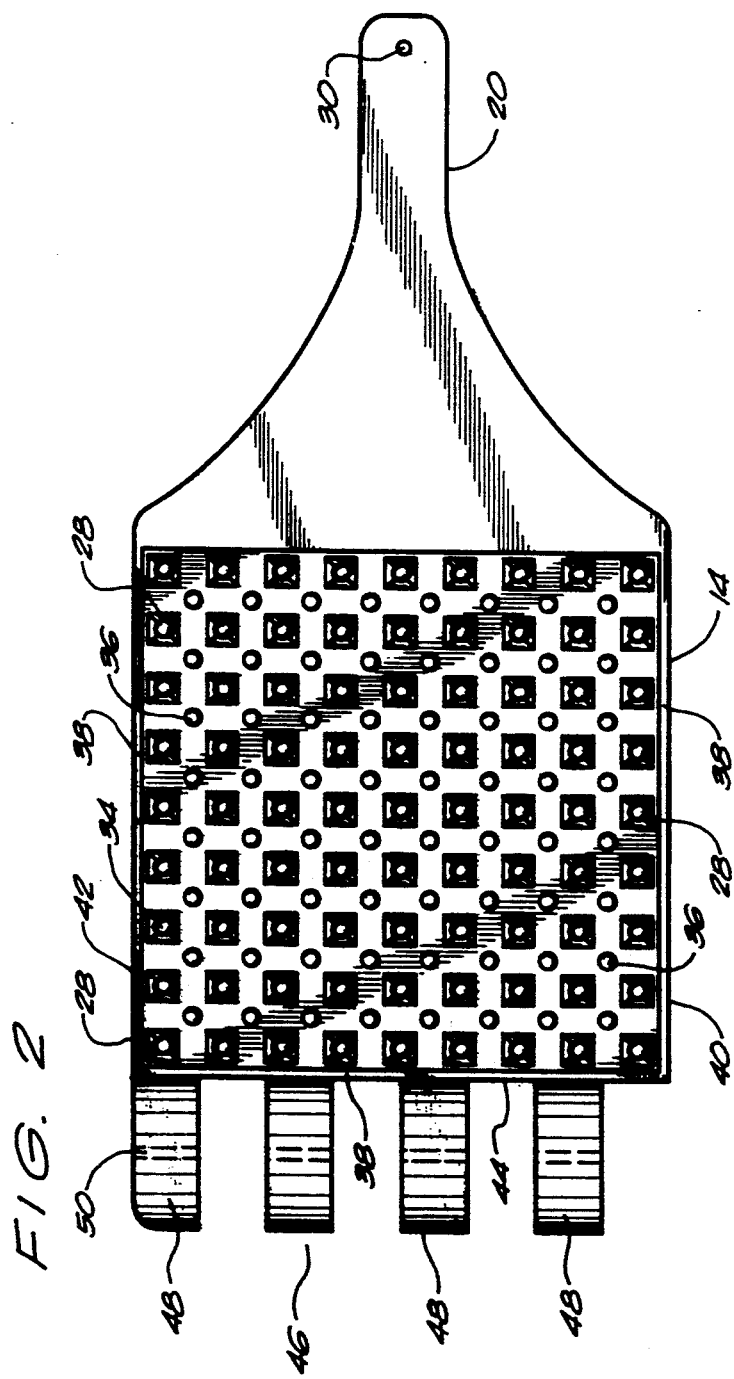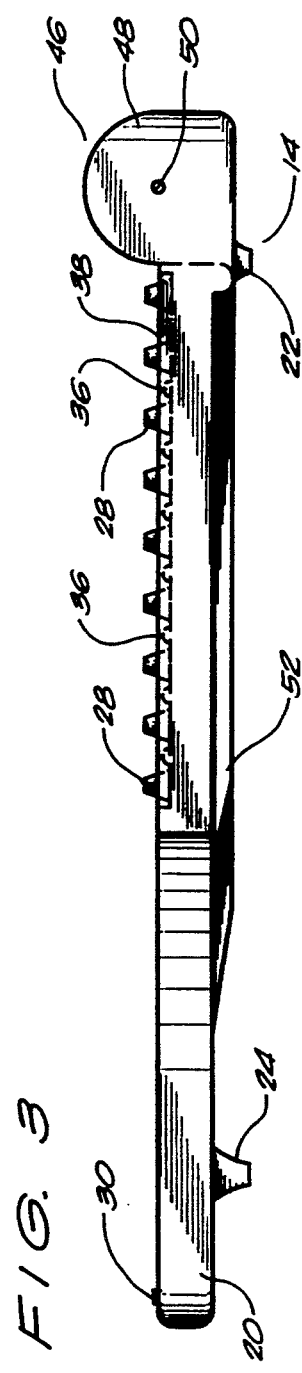

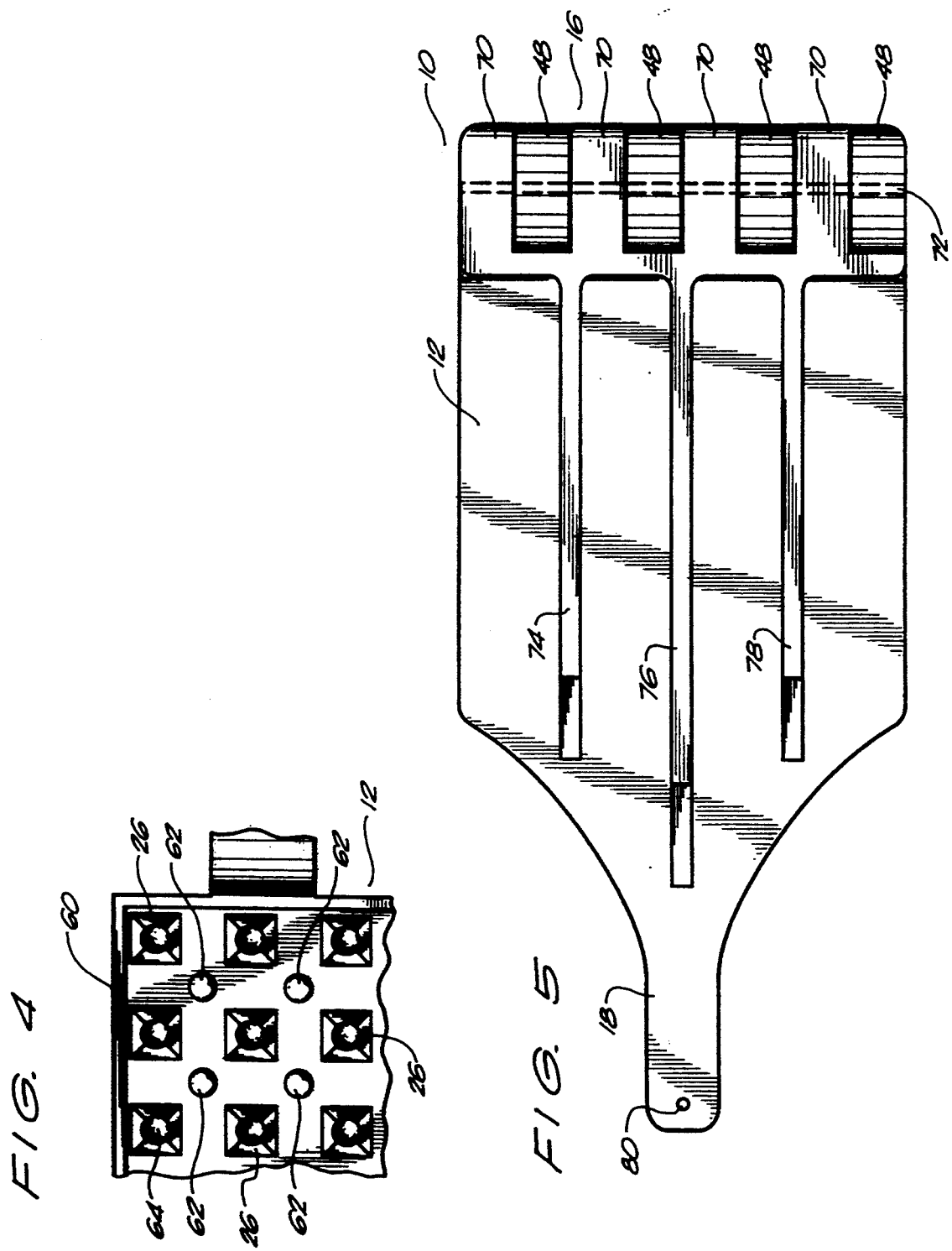

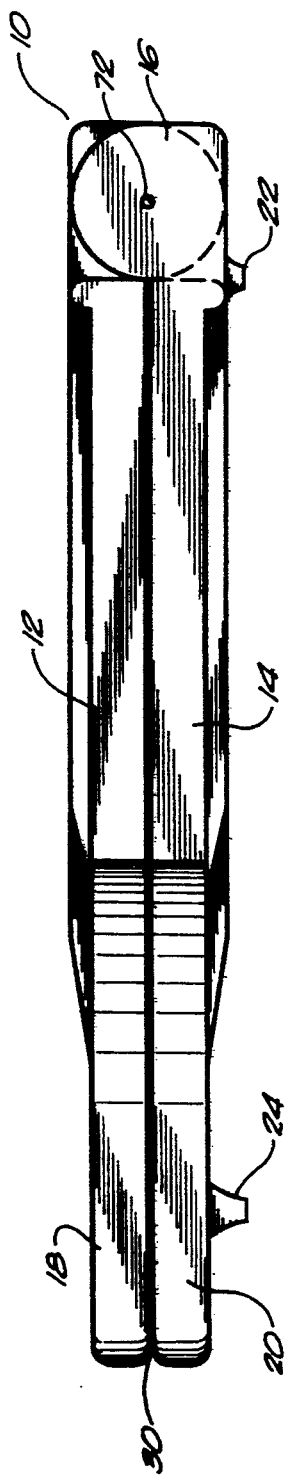
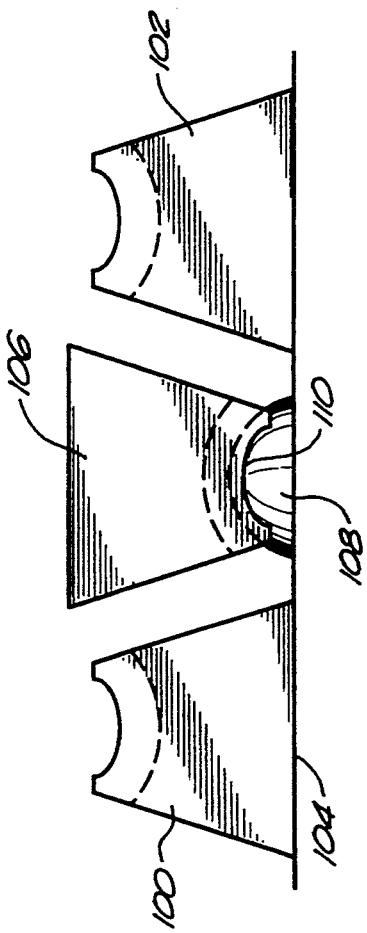
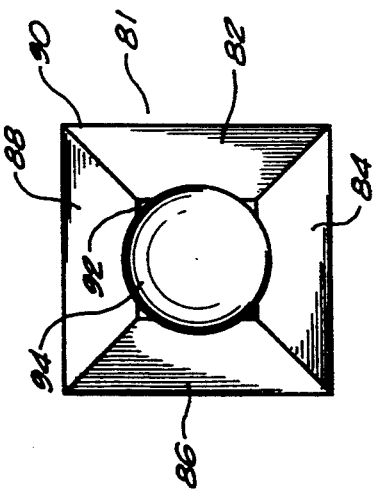
FIG. 6
FIG. 8
FIG. 7

MEAT TENDERIZING DEVICE

TECHNICAL FIELD

The present invention relates to devices for the tenderizing of meat. More particularly, the present invention relates to scissor-type devices for cutting and squeezing meat.

BACKGROUND ART

When a section of meat is cut from the flesh of an animal, the section of meat will have tendons and gristle extending therethrough. When persons consume the meat, it is desirable to have the meat as tender as possible. The presence of such tendons, veins, and gristle interferes with the enjoyment of the meat. This is particularly the case where the section of meat is wild game.

In the past, various devices have been employed so as to tenderize the meat. There are many types of electric meat tenderizing devices which drive a motor and cutting blades. These cutting blades will extend through the section of meat so as to effectively tear apart the gristle in the meat. Unfortunately, these meat tenderizing devices are very expensive and are generally not designed for household or consumer use. These tenderizing devices are often utilized at the slaughterhouse or in the butcher shop.

Typically, household consumers will attempt to tenderize a piece of meat by hammering the piece of meat. This hammering can occur through the use of a hammer-type device having sharp surfaces thereon. Unfortunately, the hammering of the meat for the purposes of tenderizing is an extended operation. It can often take over one-half hour to properly tenderize a section of meat from wild game. Also, during this hammering operation, the delicious juices of the meat are splattered thereabout and lost from the meat. It is desirable to retain as much of the juice as possible during the tenderizing of the meat.

In the past, various patents have issued on meat tenderizing devices.

U.S. Pat. No. 112,092, issued on Feb. 21, 1871, to L. B. Tarbox describes a meat tenderizer in which a handled surface is hinged to a bottom surface. A variety of pyramid-shaped projections extend outwardly from the upper surface and upwardly from the bottom surface. These pyramid-type projections are intermeshed for the purpose of cutting and tenderizing the meat. A handle extends outwardly from the top surface so as to provide leverage for the proper tenderizing of the meat.

U.S. Pat. No. 158,280, issued on Dec. 29, 1874, to J. W. James teaches a beef-steak crusher in which one surface is pivotally connected to another surface. Handles extend outwardly from these surfaces. One of the surfaces has a plurality of sharp cone-shaped members extending upwardly therefrom. The other surface includes a plurality of receptacles that receive the ends of these cone-shaped projections.

U.S. Pat. No. 282,566, issued on Aug. 7, 1883, to G. W. Ramsey teaches a meat tenderizing device in which a first arm is pivotally connected to a second arm. A plurality of intermeshing pyramid-shaped surfaces provide the tenderizing activity.

U.S. Pat. No. 504,892, issued on Sep. 12, 1893, to B. H. Passmore teaches a meat tenderizing device having a first handled surface connected to a second surface. Each of these surfaces has truncated pyramid-shaped projections intermeshing.

U.S. Pat. No. 573,660, issued on Dec. 22, 1896, to H. C. Hubbell describes another type of meat tenderizing device which has pointed meshed projections on the inner surface of matching plates. Each of these projections has a curved outer surface.

U.S. Pat. No. 715,695, issued on Dec. 9, 1902, to F. M. Robinson shows a meat tenderizing device in which a first handled surface is hingedly connected to a second handled surface. A plurality of pyramid-shaped projections extend outwardly from each of these surfaces so as to be intermesheded when the handle is closed over the other surface.

U.S. Pat. No. 1,116,668, issued on Nov. 10, 1914, to A. Barringer shows a meat tenderizing device in which a plurality of truncated cones are provided on matching surfaces. Spring-type members are used so as to draw these surfaces together for the tenderizing of meat.

U.S. Pat. No. 2,396,020, issued on Mar. 5, 1946, to F. P. Savage shows a meat perforator. This device includes two surfaces, each of the surfaces having intermeshing rows of truncated pyramids. The surfaces are compressed together for the tenderizing of the meat.

British Patent No. 15,387, issued in 1900, discloses a meat tenderizer in which a top surface is hinged to a bottom surface. The teeth on each of the surfaces mesh together so as to allow for the penetration of the meat.

Unfortunately, none of these devices has been effectively employed for the tenderizing of meat. In the various configurations shown by these devices, the compression of the meat is accomplished without effectively tearing the gristle, tendons, and veins. Additionally, none of these devices effectively retains the juices during this cutting and compressing activity.

It is an object of the present invention to provide a meat tenderizing device that effectively tenderizes a section of meat.

It is another object of the present invention to provide a meat tenderizer that retains the Juices during the tenderizing activity.

It is another object of the present invention to provide a meat tenderizer that quickly and easily tenderizes a section of meat.

It is a further object of the present invention to provide a meat tenderizer that is relatively inexpensive, easy to use, and easy to manufacture.

It is still a further object of the present invention to provide a meat tenderizer that is quick and easy to clean after use.

These and other objects and advantages of the present invention will become apparent from a reading of the attached specification and appended claims.

SUMMARY OF THE INVENTION

The present invention is a meat tenderizing device comprising a first plate having a surface with a plurality of truncated pyramid projections extending outwardly therefrom, a second plate having a plurality of projections extending outwardly therefrom, a first handle connected to the first plate and extending outwardly therefrom, and a second handle connected to the second plate and extending outwardly therefrom. Each of the truncated pyramid projections has a hole formed on an area opposite the surface of the plate. The plurality of projections of the second plate are in meshing relationship with the projections of the first plate. The second plate is hingedly connected to the first plate. The first and second handles serve to move the plates between a first position and a second position. The truncated pyramid projections are arranged in a plurality of rows extending across a surface of the first plate. The hole in each of the truncated pyramid projections is a semi-spherical indentation formed in the projections. The plurality of projections of the second plate includes a plurality of semi-spherical members. The semi-spherical members have a size conforming to the semi-spherical indentations. In the first position, the first and second plates are meshed together such that the semi-spherical indentations of the first plate receive the semi-spherical members of the second plate. The first plate also has a plurality of semi-spherical members arranged in rows extending between adjacent rows of the truncated pyramid projections. The semi-spherical members extend outwardly from the surface of the first plate. The projections of the second plate also include a plurality of truncated pyramid projections extending outwardly therefrom. Each of the truncated pyramid projections has a hole formed therein. This hole serves to receive the semi-spherical members of the first plate when the first and second plates are in the first position.

The first and second plates are in generally parallel relationship in the first position. The first and second plates are angularly offset from each other in the second position.

At least one of the first and second handles has a button member affixed thereto and extends outwardly toward the other of the first and second plates. The button member is in abutment with the other of the first and second handles when the plates are in the first position.

The first plate has a first hinge section extending outwardly therefrom opposite the first handle. The second plate has a second hinge section extending outwardly therefrom opposite the second handle. The first hinge section is pivotally connected to the second hinge section. The first hinge section has a plurality of portions intermeshed with portions of the second hinge section. The first hinge section and the second hinge section have a pin extending therethrough transverse to a longitudinal axis of the first and second plates. The first plate has a reinforcing bar extending therealong. This reinforcing bar is positioned on a side of the plate opposite the plurality of truncated pyramid projections. The second plate has a plurality of bumpers affixed to a surface opposite the plurality of projections. These bumpers serve to support the second plate in a parallel relationship to a support surface. The first plate has a first ledge extending around a portion of a periphery of the first plate. The ledge extends upwardly from the surface of the first plate. The ledge has a height less than the height of the truncated pyramid projections. The second plate has a second ledge extending around a portion of a periphery of the second plate. This second ledge extends perpendicular to the second plate. The first ledge is in abutment with a surface of the second ledge when the first and second plates are in the first position.

BRIEF DESCRIPTION OF THE DRAWINGS

FIG. 2 is a plan view of the plates used in the present invention.

FIG. 3 is side view of the plates of the present invention.

FIG. 4 is a close-up isolated view showing the projections and ledges of the plates of the present invention.

FIG. 5 is a plan view of the outer surface of the plates of the present invention.

FIG. 6 is a side elevational view of the meat tenderizing device of the present invention in its closed position.

FIG. 7 is a plan view of a truncated pyramid projection.

FIG. 8 is a closeup side elevational view of the meshing of projections of the plates of the present invention.

DETAILED DESCRIPTION OF THE INVENTION

Figure 1:
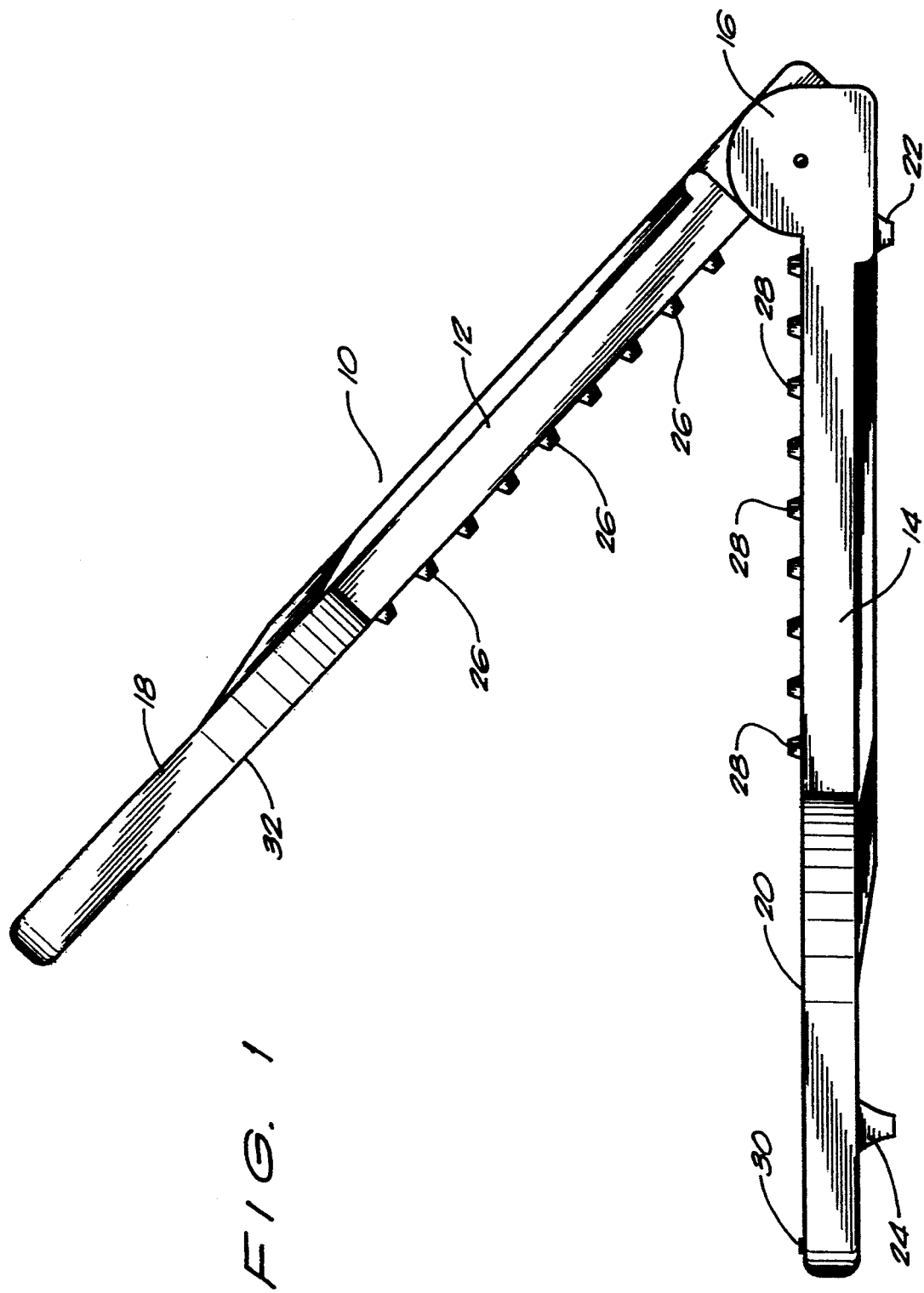
FIG. 1 is a side elevational view showing the meat tenderizing device of the present invention in its open position.

Referring to FIG. 1, there is shown at 10 the meat tenderizing device in accordance with the preferred embodiment of the present invention. The meat tenderizing device 10 includes a first plate 12, a second plate 14, a hinge section 16, a first handle 18, and a second handle 20. As can be seen, the first handle 18 extends outwardly from the first plate 12 on an end opposite the hinge section 16. Similarly, the second handle 20 extends outwardly of the second plate 14 opposite the hinge section 16. Bumpers 22 and 24 are connected to the bottom side of the second plate so as to support the meat tenderizing device 10 on a level surface.

In FIG. 1, it can be seen that the first plate 12 has a plurality of projections 26 extending outwardly therefrom. A second plate 14 includes a plurality of projections 28 extending upwardly therefrom. As will be described hereinafter, the projections 26 and 28 have the form of a truncated pyramid with a hole formed in the outer surface. The projections 26 mesh with the projections 28 when the first handle 18 is moved toward the second handle 20. The plates 12 and 14 will pivot about the hinge section 16 when the handles move in this manner. A button 30 is provided on a surface of the second handle 20. This button 30 will abut an inner surface 32 of the first handle 18 when the handle 18 is moved into juxtaposition with the second handle 20.

In the present invention, the plate members 12 and 14, along with the projections 26 and 28, respectively, are made of a polycarbonate material with TEFLON (TM) included therein. The TEFLON (TM) material makes the device 10 easy to wash and will avoid the retention of meat on the surfaces of the plates 12 and 14. Although this is the preferred type of material, it is within the scope of the present invention that various other types of materials can be used for the formation of the device 10. The bumpers 22 and 24 can be made of rubber, or other suitable material.

FIG. 2 is an isolated view of the second plate 14. The configuration of the second plate 14 is generally identical to the configuration of the first plate 12. As can be seen in FIG. 2, the second plate 14 includes a plurality of truncated pyramid projections 28 over the surface of the second plate 14. Each of the truncated pyramid projections includes a hole 34 formed therein. As can be seen, the truncated pyramid projections 28 extend in rows across the surface of the second plate 14. Importantly, the second plate 14 also includes a plurality of semi-spherical members 36. The semi-spherical members 36 are affixed to a surface of the plate 14 and extend upwardly therefrom. A ledge 38 extends around a portion of the periphery of the second plate 14. This ledge 38 extends upwardly from a surface of the plate 14. The ledge 38 extends along the sides 40 and 42 along with the end 44. The ledge 38 has a height less than the height of the truncated pyramid projections 28. The ledge 38 is an important aspect of the present invention. In prior art devices, the juices of the meat were lost during the tenderizing activity. The ledge 38 extends around the periphery of the plate 14 for the purposes of retaining the juices during the tenderizing activity. When the first plate 12 is meshed with the second plate 14, the juices will be contained within the area bounded by the ledge 38.

It is important to note that the first plate 12 has a virtually identical configuration to the second plate 14. However, the truncated pyramid projections 26 of the first plate 12 will be intermeshed between the truncated pyramid projections 28 of the second plate 14. Specifically, the semi-spherical hole 34 formed in each of the truncated pyramids 28 will engage semi-spherical members formed on the surface of the first plate 12. The semi-spherical indentations formed on the outer surfaces of the truncated pyramid projections 26 of the first plate 12 will receive the semi-spherical members 36 of the second plate 14. In this manner, a complete "meshing" can occur. As will be described hereinafter, this creates a more complete "tearing" of the gristle of the meat.

In FIG. 2, it can be seen that the handle 20 extends outwardly from the plate 14. The button 30 is affixed to the surface of the handle 20. Additionally, a hinge section 46 is formed at the end of the second plate 14 opposite the handle 20. The hinge section 46 is made up of a plurality of portions 48 extending outwardly at spaced intervals from the end 44 of the plate 14. A pin passageway 50 extends through each of these portions 46 so as to allow for the receipt of a pin therein.

FIG. 3 is a side view of the plate 14. As can be seen, the truncated pyramid projections 28 extend upwardly from the surface of the plate 14. The semi-spherical members 36 are affixed to the surface and extend upwardly therefrom. The ledge 38 extends across the plate 14. This ledge 38 is illustrated as having a height greater than the height of the semi-spherical members 36 but less than the height of the truncated pyramid projections 28. The hinge section 48 is illustrated as having a pin opening 50 formed therein. The bumpers 22 and 24 extend downwardly from the bottom surface 52 of the second plate 14.

FIG. 4 is a closeup view of the arrangement of a portion of the first plate 12. As can be seen, the first plate 12 includes truncated pyramid projections 26 arranged in rows extending across the surface of the first plate 12. A ledge 60 extends around a portion of the periphery of the first plate 12. The ledge 60 extends upwardly from the surface of the first plate 12 in the manner described hereinbefore in connection with the second plate 14. Semi-spherical members 62 are formed on the surface of the first plate 12 and positioned generally between the diagonal corners of the truncated pyramid projections 26. As was described previously, the truncated pyramid projections 26 also include a hole 64 formed on an outer surface of the truncated pyramid projections 26. In normal use, the holes 64 will have a semi-spherical configuration so as to properly receive the semi-spherical members 28 of the second plate 14. The semi-spherical members 62 have a configuration so as to be received by the holes 34 of the truncated pyramid projections 28 of the second plate 14.

FIG. 5 illustrates a top view of the meat tenderizing device 10 of the present invention. In particular, the top side of the first plate 12 is particularly illustrated. The handle 18 extends outwardly from the first plate 12 opposite the hinge section 16. The first plate 12 includes a plurality of hinge portions 70 which mesh with the hinge portions 48 of the second plate 14. A pin 72 extends through the hinge section 16 such that the first plate 12 can pivot relative to the second plate 14. In FIG. 5, it can be seen that a plurality of reinforcing bars 74, 76, and 78 extend across a surface of the first plate 12. These reinforcing bars 74, 76, and 78 are in generally parallel relationship with the longitudinal axis of the device 10. The reinforcing bars 74, 76, and 78 serve to improve the strength and rigidity of the first plate 12. Similar reinforcing bars can also be applied to the second plate 14. In FIG. 5, it can be seen that the handle 18 of the first plate 12 includes a hole 80. The hole 80 is formed on the handle 18 so as to allow the device 10 to be hung from a hook for storage and convenience.

FIG. 6 shows the tenderizing device 10 with the plates 12 and 14 in their closed position. In this position, the handles 18 and 20 are moved so as to be in juxtaposition with one another. The button 30 serves to keep a small space between the inner surfaces of each of the handles 18 and 20. The plates 12 and 14 are closed such that their corresponding ledge surfaces are in abutment. This serves to retain the juice within the area between the plates 12 and 14. When the plates 12 and 14 are in the position shown in FIG. 6, there will be a piece of meat between the plates 12 and 14. The action of the truncated pyramids and semi-spherical members will effectively serve to cut through the tough gristle, tendons, and veins of the meat contained therewithin. The bumpers 22 and 24 can be used so as to support the device 10 in a generally level position on a support surface. After a desired period of time, the handles 18 and 20 can be moved away from each other so as to be angularly offset in the manner shown in FIG. 1.

FIG. 7 is an isolated plan view of a single truncated pyramid 81. The truncated pyramid 81 has four sides 82, 84, 86, and 88. The sides extend upwardly and inwardly toward one another. The truncated pyramid has a bottom periphery 90 and a top surface 92. The hole 94 is formed in this top surface 92. The hole 94 can be formed by drilling or by a plastic forming processes. If a drilling operation is used, then the hole 94 will have a generally cylindrical configuration. If plastic forming process is used, then the hole 94 should, preferably, have a semi-spherical configuration. The diameter of the hole 94 will conform to at least a portion of the diameter of the semi-spherical members on an opposite plate from that on which the truncated pyramid 81 extends.

FIG. 8 shows the manner in which the truncated pyramids 100 and 102 of the plate 104 mesh with a truncated pyramid 106 of an adjacent plate. It can be seen that the truncated pyramid 106 is in abutment with an exterior surface of a semi-spherical member 108. The semi-spherical member 108 is positioned between the pyramids 100 and 102 and extends upwardly from the surface 104. The hole 110 of the truncated pyramid 106 will receive the exterior surface of the semi-spherical member 108. Similarly, the pyramids 100 and 102 will receive a corresponding semi-spherical member on the other plate. The pyramid 106 is shown as extending downwardly between the outer surfaces of the pyramids 100 and 102. After experimentation, it has been found that this form of intermeshing of the truncated pyramid surfaces 100, 102, and 106 serves to effectively cut through the tough portions of a section of meat positioned on each of the plates. Similarly, the engagement of the hole 110 with the semi-spherical member 108 further serves to tear the tough gristle of the meat. The present invention, by its specific configuration, literally tears, stretches, pulls apart and breaks down the tissue, fiber and muscles in the meat. It is believed that the interaction of the circular hole of the pyramids with the semi-spherical member creates a "curved" cut across the rather linear section of gristle, veins, and tendons in the section of meat. This causes a more complete tearing of such tough portions than a "linear" style of meat tenderizing.

The foregoing disclosure and description of the invention is illustrative and explanatory thereof. Various changes in the details of the illustrated construction may be made within the scope of the appended claims without departing from the true spirit of the invention. The present invention should only be limited by the following claims and their legal equivalents.

I claim:

1. A meat tenderizing device comprising:
   a first plate having a surface with a plurality of truncated pyramid projections extending outwardly therefrom, each of said truncated pyramid projections having a hole formed in an area opposite said surface;
   a second plate having a plurality of projections extending outwardly therefrom, said plurality of projections of said second plate in a meshing relationship with said projections of said first plate, said second plate being hingedly connected to said first plate;
   a first handle means connected to said first plate and extending outwardly therefrom; and
   a second handle means connected to said second plate and extending outwardly therefrom, said first and second handle means for moving said first and second plates between a first position and a second position.

2. The device of claim 1, said truncated pyramid projections arranged in a plurality of rows extending across said surface of said first plate.

3. The device of claim 1, said hole of each of said truncated pyramid projections being a semi-spherical indentation.

4. The device of claim 3, said plurality of projections of said second plate being a plurality of semi-spherical members, said semi-spherical members having a size conforming to said semi-spherical indentations.

5. The device of claim 4, said first position having said first and second plates meshed together, said semi-spherical indentations of said first plate receiving said semi-spherical members of said second plate.

6. The device of claim 2, said first plate having a plurality of semi-spherical members arranged in rows extending between adjacent rows of said truncated pyramid projections, said semi-spherical members extending outwardly from said surface of said first plate.

7. The device of claim 6, said projections of said second plate being a plurality of truncated pyramid projections extending outwardly therefrom, each of said truncated pyramid projections having a hole formed therein, said hole receiving a semi-spherical member of said first plate when said first and second plates are in said first position.

8. The device of claim 1, said first and second plates in generally parallel relationship in said first position, said first and second plates angularly offset from each other in said second position.

9. The device of claim 1, at least one of said first and second handle means having a button member affixed thereto and extending outwardly toward the other of said first and second plates, said button member in abutment with the other of said first and second plates when said plates are in said first position.

10. The device of claim 1, said first plate having a first hinge section extending outwardly therefrom opposite said first handle means, said second plate having a second hinge section extending outwardly therefrom opposite said second handle means, said first hinge section pivotally connected to said second hinge section.

11. The device of claim 10, said first hinge section having a plurality of portions intermeshed with portions of said second hinge section.

12. The device of claim 11, said first hinge section and said second hinge section having a pin extending therethrough transverse to a longitudinal axis of said first and second plates.

13. The device of claim 1, said first plate having a reinforcing bar extending therealong, said reinforcing bar positioned on a side of said plate opposite said plurality of truncated pyramid projections.

14. The device of claim 1, said second plate having a plurality of bumper means affixed to a surface opposite said plurality of projections of said second plate, said bumper means for supporting said second plate in parallel relationship to an exterior surface.

15. The device of claim 1, said first plate having a first ledge extending around a portion of a periphery of said first plate, said first ledge extending upwardly from said surface of said first plate, said first ledge having a height less than a height of said truncated pyramid projections.

16. The device of claim 15, said second plate having a second ledge extending outwardly a portion of a periphery of said second plate, said second ledge extending perpendicular to said second plate.

17. A meat tenderizing device comprising:
   a first plate having a surface with a plurality of projections extending outwardly therefrom, said first plate having a first ledge extending around at least a portion of a periphery of said first plate;
   a second plate having a surface with a plurality of projections extending outwardly therefrom, said second plate having a second ledge extending around at least a portion of a periphery of said second plate, said first plate being hingedly connected to said second plate, said first ledge having a height less than a height of said projections of said first plate, said second ledge having a height less than a height of said projections of said second plate;
   a first handle means connected to said first plate and extending outwardly therefrom; and
   a second handle means connected to said second plate and extending outwardly therefrom, said first and second handle means for moving said first and second plates between a first position and a second position.

18. The device of claim 17, said first ledge in abutment with a surface of said second plate when said first and second plates are in said first position.

19. The device of claim 17, said second plate having a plurality of bumper means affixed to a surface opposite said plurality of projections of said second plate, said bumper means for supporting said second plate in a parallel relationship to a support surface.

* * * * *